US007558450B2

(12) United States Patent
Khurgin et al.

(10) Patent No.: US 7,558,450 B2
(45) **Date of Patent: *Jul. 7, 2009**

(54) MICROWAVE PHOTONIC DELAY LINE WITH SEPARATE TUNING OF OPTICAL CARRIER

(75) Inventors: Jacob Khurgin, Baltimore, MD (US); Paul A. Morton, West Friendship, MD (US)

(73) Assignee: Morton Photonics, Inc., West Friendship, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/234,614

(22) Filed: Sep. 19, 2008

(65) Prior Publication Data

US 2009/0067772 A1 Mar. 12, 2009

Related U.S. Application Data

(63) Continuation-in-part of application No. 12/205,368, filed on Sep. 5, 2008.

(60) Provisional application No. 60/974,502, filed on Sep. 24, 2007.

(51) Int. Cl.
*G02B 1/01* (2006.01)
*G02B 6/26* (2006.01)
*G02B 6/42* (2006.01)

(52) U.S. Cl. ................................ 385/27; 385/1; 385/15
(58) Field of Classification Search ....................... None
See application file for complete search history.

(56) References Cited

U.S. PATENT DOCUMENTS 7,110,632 B2 * 9/2006 Abeles ........................ 385/15

* cited by examiner

*Primary Examiner*—Uyen-Chau N. Le
*Assistant Examiner*—Chris Chu
(74) *Attorney, Agent, or Firm*—Nadejda Reingand

(57) ABSTRACT

This invention provides a tunable delay of an optical signal having a carrier with an angular frequency $\omega_0$ and a single side band having a signal band with a median angular frequency $\omega_r$. The delay line comprises at least a first, a second and a third integrated resonators coupled sequentially to a waveguide. The first and the second resonators have angular resonant frequencies $\omega_1=\omega_r-\Delta\omega$ and $\omega_2=\omega_r+\Delta\omega$ respectively, where $\Delta\omega$ is a deviation from the median frequency. The third resonator provides a phase delay difference between the phase at the optical carrier $\omega_0$ and the phase at the median frequency $\omega_r$ equal to $(\omega_r-\omega_0)T_d$, where $T_d$ is the time delay. The device provides an equal group delay to all frequency components in the output signal and also equal phase delay for all frequency components of an RF signal when the optical signal is downconverted at a photodetector. The device may find applications controlling the time delay to antenna elements in a phased array system.

20 Claims, 7 Drawing Sheets

(a)

(b)

(a)

(b)

(a)

(b)

MICROWAVE PHOTONIC DELAY LINE WITH SEPARATE TUNING OF OPTICAL CARRIER

CROSS-REFERENCE TO RELATED APPLICATIONS

The application claims priority of U.S. Provisional Patent Application Ser. No. 60/974,502 filed Sep. 24, 2007. This application is also a Continuation-in-part of U.S. patent application Ser. No. 12/205,368 filed Sep. 5, 2008.

STATEMENT REGARDING FEDERAL SPONSORED RESEARCH AND DEVELOPMENT

This invention was made with U.S. Government support under Contract W31P4Q-07-CO150 with DARPA MTO SBIR Project, and the U.S. Government has certain rights in the invention.

FIELD OF INVENTION

This invention relates to tunable optical delay lines. More particularly it addresses the use of tunable delays in phased array antenna systems.

BACKGROUND OF THE INVENTION

A phased array is a group of radio frequency antennas in which the relative phases of the respective signals feeding the antennas are varied in such a way that the effective radiation pattern of the array is reinforced in a desired direction and suppressed in undesired directions. In typical embodiments, they incorporate electronic phase shifters that provide a differential delay or phase shift to adjacent radiating elements to tilt the radiated phase front and thereby produce far-field beams in different directions depending on the differential phase shifts applied to the individual elements.

A number of embodiments of delay lines and antenna elements can be arranged in an RF antenna assembly. The antenna assembly may include an array of antenna elements. Such arrays of antenna elements may, in certain embodiments, be spatially arranged in either a non-uniform or uniform pattern to provide the desired antenna assembly characteristics. The configuration of the arrays of antenna elements may affect the shape, strength, operation, and other characteristics of the waveform received or transmitted by the antenna assembly.

The antenna elements may be configured to either generate or receive RF signals. The physical structure of the element for signal generation and reception is similar, and typically a single element is used for both functions. A phase shifter/true time delay (PS/TTD) device is a crucial part of the antenna element providing a differential delay or phase shift to adjacent elements to tilt the radiated/received phase front.

The active phased array antenna architecture is the most applicable to the use of the PS/TTD device. A schematic of one of the embodiments of an active phased array antenna unit is shown in FIG. 1. The antenna element is connected to a circulator, which is used to separate the high power transmit path and the low power receive path, providing the required isolation. The receive path includes a limiter to avoid damage from a high input level, followed by a low noise amplifier (LNA) used to bring the received signal up to the required power level. The output of the LNA passes through a transmit/receive switch, and then through the phase shifter/true time delay (PS/TTD) device, which provides the correct phasing for that element before the output is summed with that from all other elements. The PS/TTD provides the correct phase shifting of each antenna element at all frequencies. The overall phased array antenna output power is a coherent addition of the signals from each of the antenna elements. A large number of elements provide a large total power for the system.

The tunable delay application is not limited to active phased array antennas. Alternatively, PS/TTDs can be implemented in passive phased array systems, where the power is shared passively between many antenna elements, each having its own PS/TTD device.

Photonics technologies offer significant advantages over RF and microwave electronics, which can be exploited in phased array systems. Optics offer tremendous inherent bandwidth for use in optical processing and communicating systems, due to the very high carrier frequencies (e.g. 200 THz) compared to the microwave signals (10 s GHz) upon which they operate. Photonic technologies offer much lower cost if efficiently integrated. Photonic devices are inherently small due to the short wavelength at which they operate (around 1 micron) compared to the cm and mm wavelengths of microwave integrated circuits in phased array systems. Photonic integration provides a path to massive parallelism, providing additional reductions in size and weight, together with the promise of much lower overall system cost.

Phased array antenna using photonic delay lines is shown in FIG. 2. The laser emits coherent optical radiation with optical carrier frequency to $\omega_0$ into the optical fiber that takes it to the optical modulator where it gets modulated with RF signal containing RF frequencies $\Omega$. The resulting optical signal contains frequencies $\omega=\omega_0\pm\Omega$ where the information is carried (so-called signal sidebands) as well as remaining unmodulated laser carrier. This process is sometimes referred to as upconversion.

The optical signal next gets spitted between individual elements, each element containing photonic delay line, detector and the antenna. At the detector the optical signal of frequency $\omega$ gets down converted back to the RF of frequency $\Omega$. Coherent addition of RF signals with different delays results in directional emission at angle $\theta$.

This invention relates to optical delay lines based on microresonator structures. One of the most promising delay line designs is a 'side-coupled integrated spaced sequence of resonators' (SCISSOR) shown in FIG. 3(*a*). SCISSOR structures are by definition all-pass filters with light propagating in only one direction, and thus they have zero reflection. U.S. Pat. No. 7,058,258 discloses an implementation of the side-coupled sequence of resonators for tunable dispersion compensation. It provides different group delays at different frequencies of the optical signal. The present invention addresses an opposite goal—to achieve exactly the same group delay over as wide range of frequencies as possible.

Another configuration (FIG. 3(*b*)) of the side-coupled sequence of resonators was presented in U.S. Pat. No. 7,162,120, where the resonators are coupled to the opposite sides of the core waveguide. This configuration was designed only for device compactness; there is no performance difference between having resonators on one side or on both sides of the waveguide.

A multitude of phased array systems are used in many applications, varying from large surveillance systems to weapons guidance systems to guided missiles, plus many civil applications including weather monitoring radar systems, radio-astronomy and topography.

There is a need to provide more reliable and efficient devices for tunable delays to control phased array antennas.

In the phased array antenna applications each frequency component of optical signal ω is down converted into an RF frequency component of angular frequency Ω with a phase delay $\Phi_{RF}(\Omega)$. The angle at which the phased array will emit the RF signal can be written as $\theta=\sin^{-1}(c\omega_{RF}(\Omega)/\Omega d)$, where c is the speed of light and d is the distance between antenna elements.

In order to maintain the emission angle frequency-independent, it is required that $\Phi_{RF}(\Omega)/\Omega=T_d$ where $T_d$ is referred to as the true time delay that must be constant over the whole signal bandwidth. In the state of the art phased arrays the true time delay can be achieved only by using long propagation length, and it cannot be tuned easily. In this invention we propose a compact true time delay line that is also tunable over a wide range.

SUMMARY OF INVENTION

This invention provides a tunable delay for an optical signal having a carrier frequency and a single side band; these optical signals are used, for example, in microwave photonics systems such as a phased array radar.

In the preferred embodiment the device comprises at least three integrated microresonators having resonance frequencies $\omega_1=\omega_r-\Delta\omega_1$, $\omega_2=\omega_r+\Delta\omega_1$, and $\omega_3=\omega_0\pm\Delta\omega_2$ respectively, $\omega_r$ is a median frequency of the side band, $\omega_0$ is the carrier frequency, and $\Delta\omega_{1,2}$ are deviations from those frequencies. The third resonator provides a phase delay difference between the phase at the optical carrier frequency $\Phi(\omega_0)$ and the phase at the median signal frequency $\Phi(\omega_r)$ equal to $(\omega_0-\omega_r)T_d$, where $T_d$ is the time delay. The frequency $\omega_3$ is chosen to satisfy the relation $\Phi(\omega_0)=\Phi(\omega_r)+T_d(\omega_r)(\omega_0-\omega_r)$. The first two resonators in the group provide tunable group delay for the signal band, while the remaining at least one resonator provides tunable phase delay for the optical carrier. The first and the second resonators eliminate a third order group delay dispersion over the side band frequencies of the signal band using cancellation of the positive dispersion of the first loop resonator by the negative dispersion of equal magnitude of the second loop resonator. This arrangement allows one to operate as a true time delay line for very high frequency but relatively narrow band RF signals.

The ring resonators have radius ranging from about 2 μm to about 50 μm.

The resonator frequencies are tunable using, for example, a thermo-optical effect. In one embodiment the frequencies are tunable slowly using the thermo-optical effect followed by fast tuning using carrier injection or the Stark effect. Using fast tuning the frequencies may be tuned within a range of +/−0.1% within 10 microseconds.

In one embodiment the device consists of at least one cell. The cell contains at least three ring resonators. In another embodiment the device further comprises a fourth resonator, having the same angular frequency as the third resonator. In order to achieve a relatively large delay time, the device includes multiple cells, for example, ten or more cells, each having three or four resonators.

A phased array antenna comprising a tunable delay based on microresonator structures is another object of the present invention.

Yet another object of the present invention is a method for producing a tunable delay of an optical signal having a carrier frequency and a single side band. The method comprises: introducing an input optical signal in a waveguide; coupling the optical signal sequentially to a first loop resonator, a second loop resonator and a third loop resonator; wherein the first, second and third resonators have different resonant angular frequencies $\omega_1$, $\omega_2$, and $\omega_3$; outputting a delayed optical signal, wherein all frequencies of the output optical signal have the same group delay.

DETAILED DESCRIPTION OF THE PREFERRED EMBODIMENT

Optical delay lines typically use near infrared (NIR) light, however the disclosure is not limited to this spectral range. The term "optical" in the present disclosure comprises visible, near infrared, infrared, far infrared and the near and far ultra-violet spectra.

The novel approach is applied to the processing of the optical signal for use in phased array antennas based on separate processing of the optical carrier, the upper sideband, and the lower sideband of the modulated optical signal. This technology has a number of potential implementations, which utilize the ideas of separately controlling the time delay of each signal, and also removing one of the sideband signals through optical filtering. The filtering and also separate control of each signal can be most easily implemented when the modulation frequency is high, so that separation between the optical carrier and sidebands is large. A good example of this would be a 60 GHz RF frequency modulated onto an optical carrier, providing sidebands at +/−60 GHz, also assuming some reasonable bandwidth for each sideband, e.g. 10 GHz. Such an optical signal is shown in FIG. 4.

Figure 1:
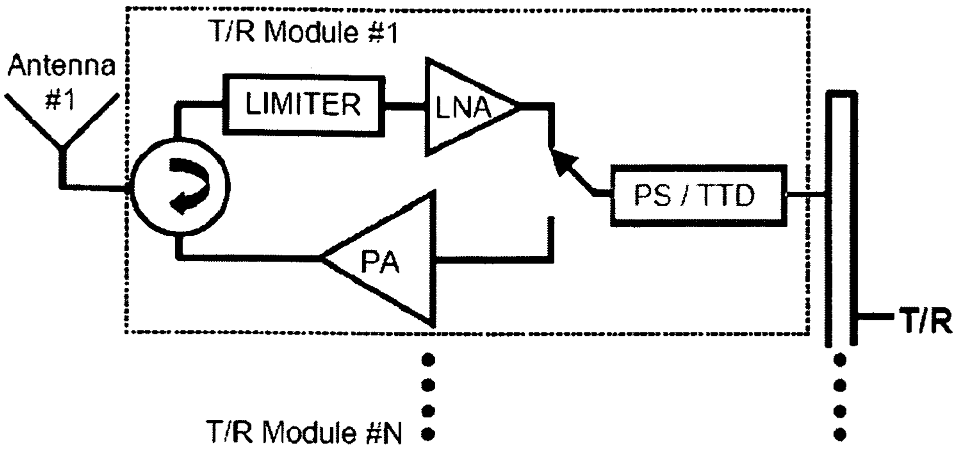
FIG. 1A schematic of one transmitter/receiver module of an active phased array system which includes the phase shift (PS)/true time delay (TTD) unit.
Figure 2:
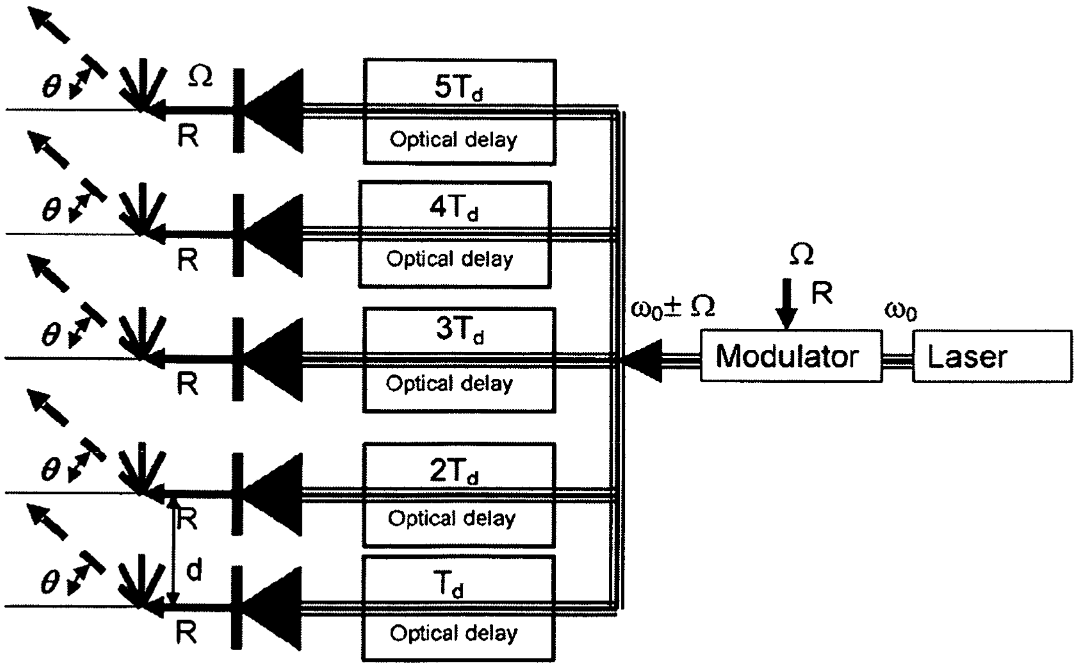
FIG. 2. Phased array antenna using photonic delay lines.
Figure 3:
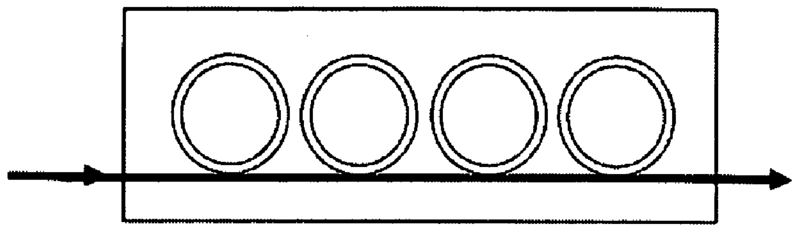
FIG. 3(*a*) A 'side-coupled integrated spaced sequence of resonators' (SCISSOR) structure; (*b*) a SCISSOR structure with the resonators coupling on the opposite sides of the core waveguide (prior art).
Figure 3:
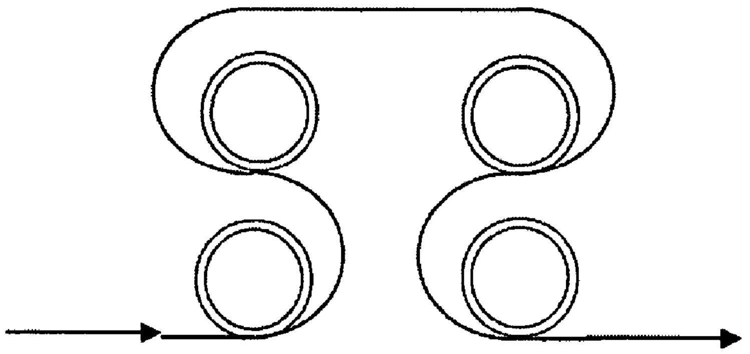
Figure 4:
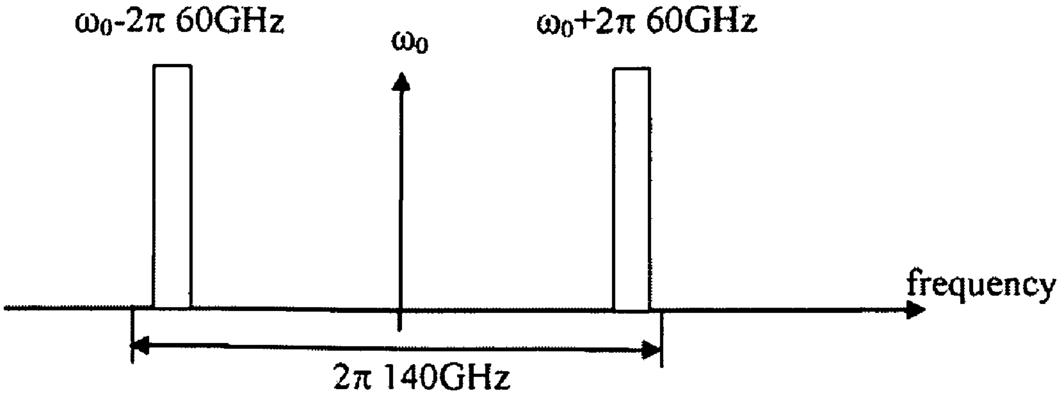
FIG. 4 Optical carrier $f_C$ (e.g. 200 THz) with sidebands at $f_0$=+/−60 GHz FIG. 5 Optical carrier with a single sideband.

The optical signal in FIG. 4 has an overall bandwidth of 130 GHz, and so a TTD device would require at least this bandwidth in order to provide an equal time delay across the whole of the signal. In fact, the device would need to include guard-bands beyond the 130 GHz in order to ensure the device would always overlap with the optical signal, and to ensure for long term operation of the device as both the optical carrier frequency and/or the TTD device slowly drift in center frequency over life. An overall bandwidth of 140

GHz at minimum is therefore required, as shown in the figure. If the RF modulation frequency is lower, such as 35 GHz, then the required bandwidth of the TTD device reduces significantly, down to 90 GHz, reducing further for lower RF frequencies. The very large bandwidth required of the optical TTD device, especially at higher RF modulation frequencies, provides a challenge to designing these devices, and limits their applicability at these high RF frequencies. When considering the signals in FIG. 4, it is clear that the TTD device is required to provide control of the time delay over a much wider frequency range (130 GHz) than the actual signal of interest (10 GHz bandwidth), and that if the requirements could be limited to only the signal of interest, with the relationship to the modulation frequency removed, then optical TTD devices could be much more effective.

One way to reduce the required bandwidth of the TTD device is to remove one of the sidebands from the optical signal. On an integrated photonic circuit it is possible to design an optical filter to simply remove one of the sidebands of the optical signal, which provides a single sideband (SSB) signal. SSB modulation cuts the bandwidth requirement of the TTD device almost in half, so that a system at 60 GHz requires only 75 GHz bandwidth, and a system at 35 GHz requires only 50 GHz. This is a significant reduction in required bandwidth, and so for systems operating at high frequencies it is extremely helpful to use SSB modulation.

The invention is focused on implementation of SSB modulation (FIG. 5) and separate control of the remaining sideband and the carrier. It is proposed to reduce the required bandwidth of the elements of the TTD device to be equal to the bandwidth of the sideband alone, that is 10 GHz, plus guard-bands, for a total bandwidth in this case equal to 20 GHz. The approach is to first remove one sideband through optical filtering, and then operate on the remaining optical carrier and second sideband independently to provide the required time delay. In this way, one group of elements provides the time delay to the sideband, with a required bandwidth of 20 GHz, and a separate element or group of elements provides the phase delay to the optical carrier. The latter element or group of elements requires only a limited bandwidth to delay the very narrow optical carrier signal.

Figure 6:
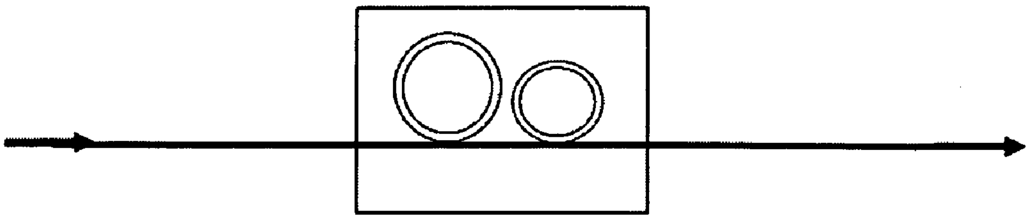
FIG. 6 Time delay device with separately tunable delays for an optical carrier and a single side band signal: (*a*) single cell; (*b*) multiple cell configuration.
Figure 6:
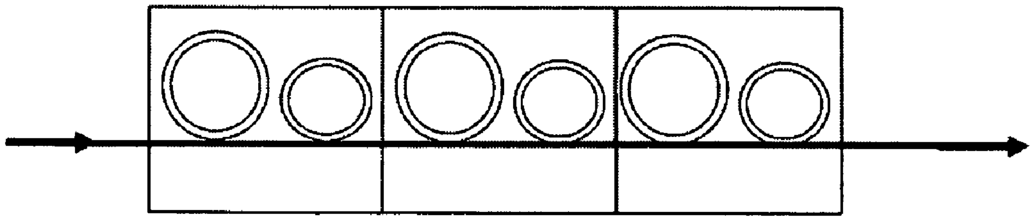

FIG. 6(*a*) shows a single ‘cell’ of a microresonator design for a novel TTD device using the described approach. In this description it is assumed that the higher sideband has been filtered from the optical signal before entering the time delay ‘cells’. In this simplest case a cell may include two microresonator elements, one resonant with the sideband and one resonant with the optical carrier. The device is designed so that the delays to the sideband and to the optical carrier are individually tuned to the same value, to provide an overall signal with the correct true time delay. This can be achieved because each of the two microresonator elements is only resonant with one part of the signal—one with the optical carrier and the other with the sideband; the microresonators have little affect on the signal for which they are not resonant.

Figure 5:
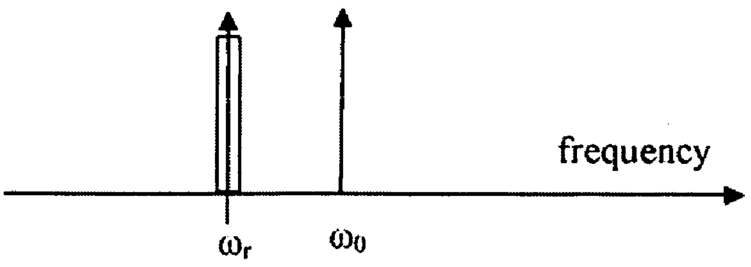

As can be seen in FIG. 5, the required bandwidth of each element of the time delay device is only enough to cover the actual signal being controlled by that element. The overall TTD device will be made up of multiple ‘cells’ in order to produce the overall required time delay as shown in FIG. 6(*b*). This approach significantly reduces the required bandwidth of any TTD element, to be equal to the actual sideband bandwidth plus guard-band of the sideband, and independent of the actual RF carrier frequency. This provides a significant improvement in system performance compared to prior art, and makes operation at high RF carrier frequencies $\omega_0$, such as 2π60 GHz, easily attainable.

Figure 7:
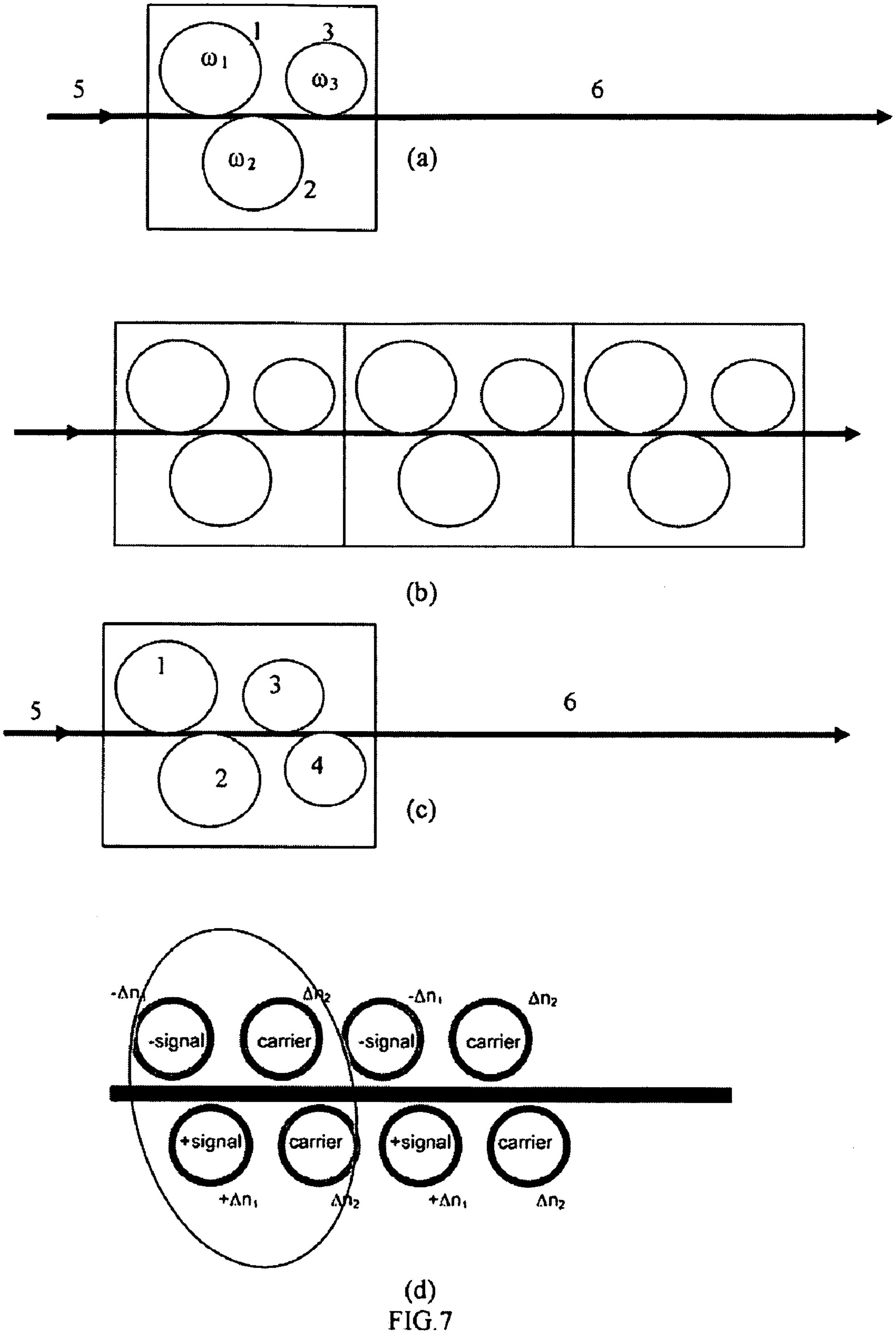
FIG. 7 Time delay device with separately tunable delays for an optical carrier and a single side band, in which the signal band delay is achieved by using two balanced rings: (*a*) single cell, (*b*) multiple cell configuration, (*c*) single cell including a fourth resonator, (*d*) multiple cell configuration including the fourth resonator.

The disadvantage of the design shown in FIGS. 6(*a*) and (*b*) is in limited tunability of the delay and limited signal bandwidth. Another embodiment of the present invention provides an improved tunability; it is shown in FIGS. 7(*a*) and (*b*). Each cell contains at least three resonators 1, 2, 3, two (1 and 2) for the signal side band and one (3) for the carrier; all coupled sequentially to a waveguide 5. Such arrangement provides large tunable delay without distortion at the output signal 6.

FIGS. 7(*c*) and (*d*) shows another embodiment of the invention. Each cell contains at least four resonators 1, 2, 3 and 4; two (1 and 2) for the signal side band and two (3 and 4) for the carrier. Calculations show that this arrangement allows longer delays to be achieved.

FIG. 7(*a*) shows the basic cell of the proposed structure. Two rings with resonant angular frequencies $\omega_1$ and $\omega_2$ are tuned below (−) and above (+) the signal frequency $\omega_r$:

$$\omega_1=\omega_r+\Delta\omega_1 \text{ and } \omega_2=\omega_r-\Delta\omega_1.$$

The third ring has resonant angular frequency $\omega_3$, which is close to the frequency of the optical carrier $\omega_c$. FIG. 7(*c*) has a similar structure with additional fourth ring with resonant angular frequency $\omega_3$.

Figure 8:
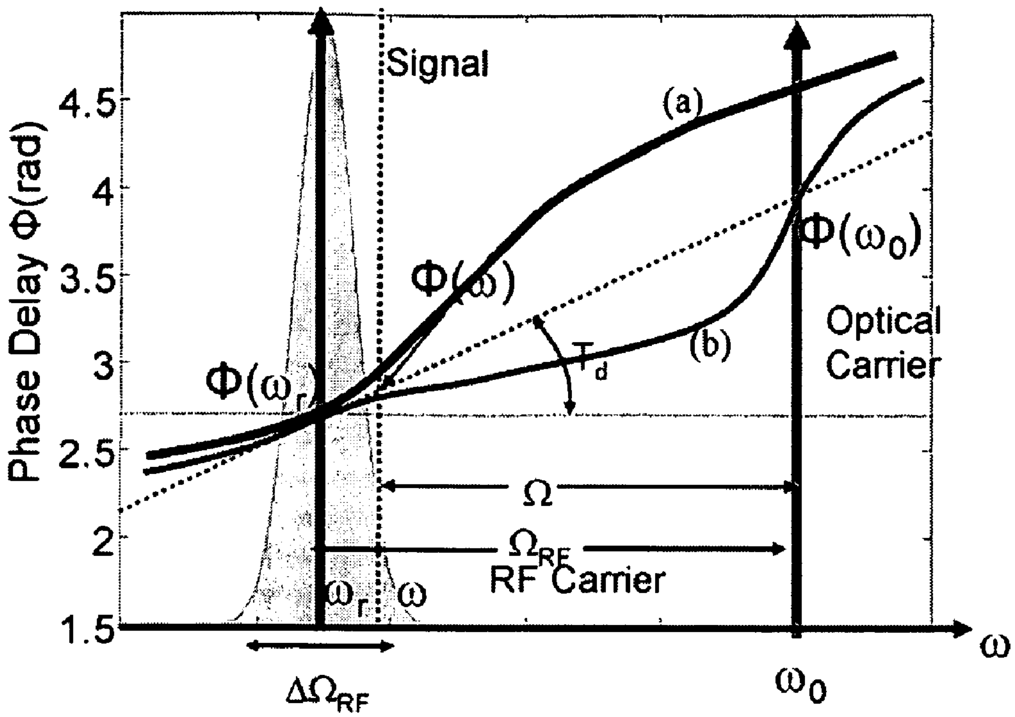
FIG. 8 Equalizing RF and envelope delays using the device of the present invention: (*a*) without separate tuning for the carrier; (*b*) with separate tuning for the carrier.

FIG. 8 shows the operating principle of the device of FIG. 7. Curve (a) represents the phase of the frequency component ω of the optical signal, Φ(ω) over the spectral region of interest. Following down conversion at a photodetector, the optical signal component ω is converted into the RF component $\Omega=\omega_0-\omega$, and the phase of the RF component $\Phi_{RF}(\Omega)=\Phi(\omega_0)-\Phi(\omega)$. To assure that all the RF components get emitted at the same angle in a phased array system the following condition must be maintained $\Phi(\omega_0)-\Phi(\omega)=(\omega_0-\omega))T_d$ i.e. the phase curve in the region of interest must be a straight line with the slope equal to the delay (shown by the dashed line). It is also desirable for the delay to be tunable.

In the relatively narrow region of frequencies within the optical signal side band the straight line (frequency independent delay) can be maintained using the “balanced scissor” arrangement of the parent patent U.S. application Ser. No. 12/205,368 filed Sep. 5, 2008, filed by the same inventive entity. The two resonators with resonant frequencies $\omega_1=\omega_r+\Delta\omega_1$ and $\omega_2=\omega_r-\Delta\omega_1$, round trip time τ and a coupling coefficient $k=(1-p^2)^{1/2}$ provide almost frequency independent time delay $$T_d=2\tau(1+\rho)/(1-\rho)+\tau^3\Delta\omega_1^2\rho(1+\rho)/(1-\rho)^3$$

that can also be made tunable by changing $\Delta\omega_1$.

However, near the carrier frequency the phase curve deviates significantly from the desired straight line. It is important that the phase curve does not need to follow the dashed line over the entire range between signal and carrier, since there is no power carried in most of that frequency range. It is only necessary for the phase curve to cross the dashed line at the carrier frequency to satisfy the condition $\Phi(\omega_0)-\Phi(\omega_r)=(\omega_0-\omega_r)T_d$ This condition can be stated as following: the group delay of the signal envelope is equal to the phase delay of the RF carrier and is accomplished in curve (b). This result is achieved by separate control of the ring resonators 3 and 4 to tune them near the carrier frequency and thus change the phase delay there without affecting the phase delay near the signal.

If we introduce a separate resonator of resonant frequency $\omega_3=\omega_0+\Delta\omega_2$ the phase at the optical carrier frequency becomes $$\Phi(\omega_0)=2\tan^{-1}((k^2\sin\Delta\omega_2\tau)/(1+\rho^2)/(\cos\Delta\omega_2\tau-2\rho))$$

By adjusting $\Delta\omega_2$ we can satisfy the equality of envelope and RF carrier delays.

One can introduce a fourth resonator identical to the third resonator in which case $$\Phi(\omega_0)=2\tan^{-1}((k^2 \sin\Delta\omega_2\tau)/(1+\rho^2)/(\cos\Delta\omega_2\tau-2\rho))$$

By adjusting $\Delta\omega_2$ we can satisfy the equality of envelope and RF carrier delays with smaller $\Delta\omega_2$.

Figure 9:
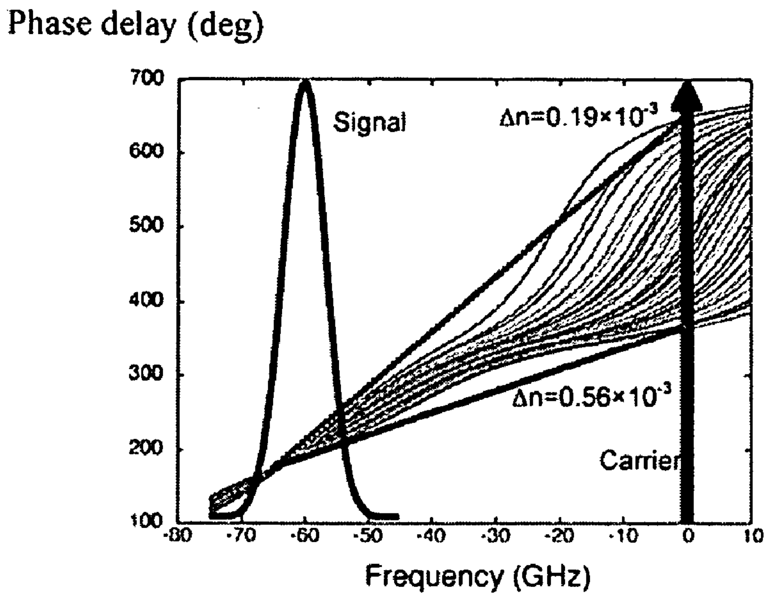
FIG. 9 Phase delay in the device of the present invention vs. optical frequency (relative to the frequency of the optical carrier).

Essentially the new configuration looks like a 'Balanced SCISSOR' structure from the co-pending U.S. patent application Ser. No. 12/205,368, but differs in the control. Instead of two separate values of index shift it requires three: two of opposite sign$\pm\Delta n_1$ for the signal and one separate (hence the name) $\alpha n_2$ for the carrier. Using this structure, rings with smaller coupling coefficients (large finesse) can be used, leading to significantly larger time delay tunability. Results shown in this application are for a tunable delay line that was designed for a 60 GHz RF carrier frequency and using a small coupling coefficient of $\kappa=0.2$, however any other parameters can be used. FIG. 9 illustrates the achieved phase delay for this particular example. A wide variation of the slope is achieved (i.e. true time delay) and the envelope delay and the RF delay are equalized.

Figure 10:
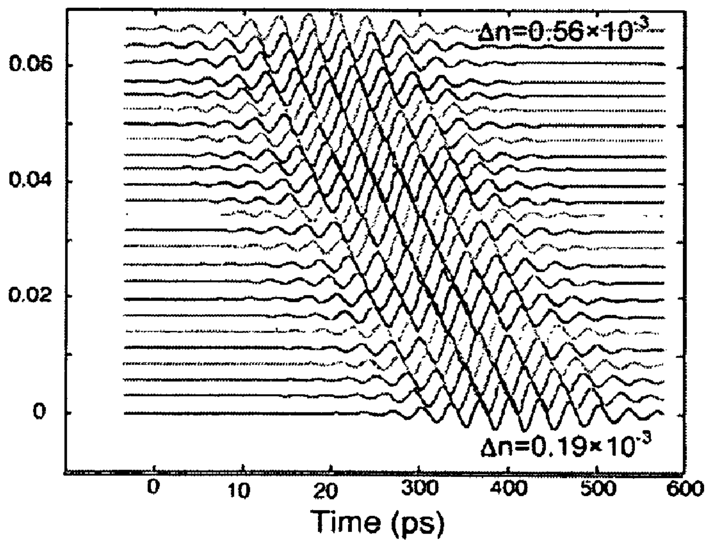
FIG. 10 RF signal waveform for different values of refraction index modulation.

FIG. 10 depicts the simulation result of the proposed device performance. The device used for this simulation has 40 rings. Each graph represents the waveform of RF signal for a different value of the refractive index modulation. A maximum of 200 ps time delay was achieved with only 40 rings, and for an index change of less than $4\times10^{-4}$. This is a tremendous improvement over the current state of the art.

A variety of technologies could be used for the tunable delay fabrication. In the preferred embodiment an active device is provided including a silicon substrate, an insulator layer, and a top silicon layer, in which the device is fabricated. The device is electronically controlled by injected carriers or by applying an electric field. In another embodiment another (slower) technology is used, which includes silica waveguides on a silicon wafer. These devices use thermal tuning by applying a heater on the resonator or waveguide structure. "Hydex" material, produced by Infinera, CA can be used for this kind of thermally tuned devices; this material has a refractive index between that of silicon and silica. Devices could also be fabricated in III-V compound semiconductors, such as InP or GaAs.

In the preferred embodiment of the present invention, a series of ring resonators is used in the device design. However, the invention is not limited to such configuration. Other embodiments include all variety of resonator types. The invention addresses an assembly of one or more pairs of tunable resonators or filters (or just responses), which when combined together provide the required overall tuning response, that is, a broad range of tunability of the overall group delay (time delay) with limited distortion. The resonators/filters are tuned in opposite directions (in wavelength) so that the combined group delay at the center wavelength between the two resonators/filters is tuned up or down as the responses move away from or towards each other. This approach is applicable to any types of resonators or filters than can be combined (amplitude and phase responses) to give the desired response, which includes micro-ring resonators, Bragg gratings, photonic crystals, free space resonators or some other form of optical resonator or filter of some sort. The device does not need to be flat, and it can also be in 3D—some resonators are spherical, and any kind of 2D or 3D structure could potentially be used. The refractive index is changed in one implementation, but it is also possible to change the coupling coefficient to tune the rings through a physical mechanical movement using MEMS. In another embodiment, the refractive index is kept unchanged while the device is tuned by changing its size.

While the above invention has been described with reference to specific embodiments, these embodiments are intended to be illustrative and not restrictive. The scope of the invention is indicated by the claims below, and all changes that come within the meaning and range of equivalents thereof are intended to be embraced therein.

What is claimed is:

1. An optical device for producing a time delay $T_d$ of an input optical signal, comprising: an optical waveguide receiving the input optical signal; the input optical signal being a single side band signal having a signal band with a median angular frequency $\omega_r$ and an optical carrier angular frequency $\omega_0$; at least a first loop waveguide resonator coupled to the waveguide, at least a second loop waveguide resonator being coupled to the waveguide; at least a third loop waveguide resonator coupled to the waveguide, the input signal being coupled in and out of the first, second, and third loop resonators; wherein the first, second and third resonators having different resonant angular frequencies $\omega_1$, $\omega_2$ and $\omega_3$; the last of all resonators outputting an output signal; the output signal being transmitted by the waveguide; the output signal providing an equal group delay to all frequency components in the input signal.

2. The optical device of claim 1, wherein the output signal is downconverted into radio frequency and used in a phased array antenna system.

3. The optical device of claim 2, wherein the device providing the equal group delay to all frequency components in the output signal and also an equal phase delay for all frequency components of an RF signal when the output optical signal is downconverted at the detector.

4. The optical device of claim 1, wherein the first and the second resonators provide equal time delay $T_d$ to all frequencies of the signal band around $\omega_r$, and the third resonator provides a phase delay difference between a phase at the optical carrier frequency $\Phi(\omega_0)$ and a phase at the median signal frequency $\Phi(\omega_r)$ equal to $(\omega_0-\omega_r)\,T_d$.

5. The optical device of claim 1, wherein the group delay $T_d$ is up to 1000 ps.

6. The optical device of claim 1, further comprising the resonant angular frequencies $\omega_1$, $\omega_2$, $\omega_3$ being achieved by different perimeters of the first, second and third resonators or by different effective refractive indices of the resonator waveguides.

7. The optical device of claim 1, further comprising: the resonant angular frequencies $\omega_1=\omega_r+\Delta\omega_1$ and $\omega_2=\omega_r-\Delta\omega_1$ of the loop resonators being equally distant by $\Delta\omega_1$ from the frequency $\omega_r$, and $\omega_3=\omega_0\pm\Delta\omega_2$, where $\Delta\omega_2$ is a difference between the third resonator frequency $\omega_3$ and the carrier frequency $\omega_0$, wherein the frequency $\omega_3$ is chosen to satisfy the relation $\Phi(\omega_0)=\Phi(\omega_r)+T_d(\omega_r)(\omega_0-\omega_r)$.

8. The optical device of claim 7, wherein the resonant angular frequencies $\omega_1$, $\omega_2$, $\omega_3$ are tunable by changing $\Delta\omega_1$ and $\Delta\omega_2$.

9. The optical device of claim 8, wherein the resonant angular frequencies $\omega_1$, $\omega_2$, $\omega_3$ are tunable slowly using the thermo-optical effect followed by fast tuning using carrier injection or the Stark effect.

10. The optical device of claim 8, wherein the resonant angular frequencies $\omega_1$, $\omega_2$, $\omega_3$ are tunable within a range of +/−0.1% within 10 microseconds.

11. The optical device of claim 1, wherein each of the resonators are ring resonators having a radius ranging from about 2 μm to about 50 μm.

12. The optical device of claim 1, further comprising a first set of resonators having at least ten resonators; a second set of resonators having at least ten resonators; a third set of resonators having at least ten resonators; each resonator of the first, second and third sets of resonators being coupled to the waveguide; the first, second and third set of resonators having resonant angular frequencies $\omega_1$, $\omega_2$ and $\omega_3$ respectively.

13. The optical device of claim 1, further comprising at least a fourth loop waveguide resonator coupled to the waveguide; the fourth resonator having a resonant angular frequency $\omega_3$; the input signal being coupled in and out of the fourth resonator after passing the first, second and third resonators.

14. The optical device of claim 13, further comprising: the resonant angular frequencies $\omega_1=\omega_r+\Delta\omega_1$ and $\omega_2=\omega_r-\Delta\omega_1$ of the loop resonators being equally distant by $\Delta\omega_1$ from the frequency $\omega_r$, and $\omega_3=\omega_0\pm\Delta\omega_2$, where $\Delta\omega_2$ is a difference between the third resonator frequency and the carrier frequency; wherein the frequency $\omega_3$ is chosen to satisfy the relation $\Phi(\omega_0)=\Phi(\omega_r)+T_d(\omega_r)(\omega_0-\omega_r)$.

15. The optical device of claim 14, further comprising a first set of resonators having at least ten resonators; a second set of resonators having at least ten resonators; a third set of resonators having at least ten resonators; a fourth set of resonators having at least ten resonator; each resonator of the first, second, third and fourth sets of resonators being coupled to the waveguide; the first, second, third and fourth set of resonators having resonant angular frequencies $\omega_1$, $\omega_2$, $\omega_3$ and $\omega_3$ respectively.

16. A method of producing an optical signal delay $T_d$, the method comprising: introducing an input optical signal in a waveguide, the optical signal having an optical carrier and a single side band; coupling the optical signal to a first loop resonator; coupling a light beam outputted by the first resonator to a second loop resonator; coupling a light beam outputted by the second resonator to a third loop resonator; wherein the first, second and third resonators having different resonant angular frequencies $\omega_1$, $\omega_2$, and $\omega_3$; outputting a delayed optical signal, wherein all frequencies of the input optical signal have the same group delay.

17. The method of producing an optical signal delay of claim 16, wherein: the first and the second resonators provide equal group delay $T_d$ to all frequencies of the signal band around $\omega_r$, the delay $T_d$ and the third resonator provides a phase delay difference between the phase at the optical carrier frequency $\Phi(\omega_0)$ and the phase at median signal frequency $\Phi(\omega_r)$ equal to $(\omega_0-\omega_r)$ $T_d$.

18. The method of producing an optical signal delay of claim 17, further comprising: tuning the resonant angular frequencies $\omega_1$, $\omega_2$, $\omega_3$ resulting in tuning the group delay of the delayed optical signal.

19. The method of producing an optical signal delay of claim 17, further comprising: eliminating a third order group delay dispersion over the side band signal achieved using cancellation of the positive dispersion of the first loop resonator by the negative dispersion of equal magnitude of the second loop resonator.

20. The method of producing an optical signal delay of claim 17, further comprising: coupling a light beam outputted by the third resonator to a fourth loop resonator, having an angular frequency $\omega_3$.

* * * * *